United States Patent

Suzuki et al.

[11] Patent Number: 5,250,320
[45] Date of Patent: Oct. 5, 1993

[54] METHOD FOR PRODUCING MAGNETIC RECORDING MEDIUM

[75] Inventors: Akihiro Suzuki; Norio Shibata; Shinsuke Takahashi, all of Kanagawa, Japan

[73] Assignee: Fuji Photo Film Co., Ltd., Kanagawa, Japan

[21] Appl. No.: 13,352

[22] Filed: Feb. 4, 1993

[30] Foreign Application Priority Data

Feb. 28, 1992 [JP] Japan ................................. 4-75859

[51] Int. Cl.$^5$ ............................................. B05D 5/12
[52] U.S. Cl. .................................. 427/128; 427/434.3
[58] Field of Search ............................ 427/128-132, 427/434.3

Primary Examiner—Bernard Pianalto
Attorney, Agent, or Firm—Sughrue, Mion, Zinn, Macpeak & Seas

[57] ABSTRACT

A method for producing a magnetic recording medium in which widthwise deviations in thickness of coating caused by widthwise unevenness of the support being coated are suppressed so that the coating thickness is made uniform. An extrusion-type coating head is used for coating, and a magnetic coating composition is continuously extruded from a top end portion of a slit of the coating head onto the surface of the support while the support is running continuously along a back edge surface and a curved doctor edge surface having a curvature thereby to coat the surface of the support with the magnetic coating composition, the method being characterized in that coating is carried out in such manner so that the following condition is satisfied:

$$12\mu \, (m/d^3)Ut > 0.20(T/R)$$

where
$\mu$: composition viscosity (poise)
m: slit length (mm)
d: clearance of the slit (mm)
U: coating speed (m/sec)
t: coating thickness ($\mu$m)
T: tension at a coating portion (kgf/whole width)
R: radius of curvature of the doctor edge (mm).

13 Claims, 2 Drawing Sheets

METHOD FOR PRODUCING MAGNETIC RECORDING MEDIUM

BACKGROUND OF THE INVENTION

The present invention relates to a method for producing a magnetic recording medium, and particularly relates to a coating method for use in producing a magnetic recording medium using an extrusion-type coating head for coating the surface of a moving support with a coating composition continuously extruded onto the surface of the support having a uniform coating thickness.

Various coating methods have been employed for producing a magnetic recording medium, and of such methods a coating method using such an extrusion-type coating head as shown in FIG. 4 has often been used. In this coating method, coating is carried out while a coating head 10 is urged against a running support 1, while simultaneously a coating composition is extruded through a slit 4 between a doctor edge surface 2 and the support 1, thereby to coat the surface of the support 1 with the coating composition in a continuous manner, as illustrated in FIG. 4. Although the use of this method contributes to high-speed thin-film coating, the method has problems in that striped unevenness and widthwise deviations in film thickness are apt to be caused by impurities trapped on the coating surface in the small gap between the support 1 and the doctor edge surface 2. Various proposals have been made to overcome the foregoing problems, which can be classified as follows:

(1) Proposals in which the doctor edge surface 2 is formed with a desired curvature (R, $R_1$ and $R_2$) to provide a countermeasure against trapping of impurities. (See Japanese Patent Unexamined Publications Nos. Sho. 60-238179, Sho. 63-88080, and Hei. 2-265672.)

(2) Proposals in which the pressure ($P_w$) of a coating composition produced by the lapping of the support 1 to the doctor edge surface 2 is defined so as to prevent striped unevenness and the like. (See Japanese Patent Unexamined Publication Nos. Sho. 62-117666 and Hei. 3-162).

(3) Proposals in which the diameter of a pocket 3 of a coating head, the clearance (d) and length (m) of the slit 4, the viscosity of a coating composition, etc., are defined so as to make the quantity of coating composition extruded onto the recording medium uniform in the widthwise direction of the slit. (See Japanese Patent Unexamined Publication No. Hei. 1-180266 and Japanese Patent Application No. Hei. 1-340394.)

However, in an extrusion-type coating apparatus with a doctor edge such as disclosed in Japanese Patent Unexamined Publications Nos. Sho. 60-238179, Sho. 63-88080, and Hei. 2-265672 mentioned in (1) above in which the doctor edge surface is curved, deviations of coating thickness due to widthwise unevenness of the support are apt to occur, although generation of striped unevenness caused by high-speed thin-film coating and impurity trapping may be prevented effectively. It is therefore difficult to perform coating stably and continuously.

In the approaches disclosed in Japanese Patent Unexamined Publication Nos. Sho. 62-117666 and Hei. 3-162 mentioned in (2) above, the coating composition pressure ($P_w$) produced by the lapping of the support is controlled. In such methods, however, deviations in thickness of the coating film tend to occur in the case where the support is uneven in the widthwise direction.

In the methods disclosed in Japanese Patent Unexamined Publication No. Hei. 1-180266 and Japanese Patent Application No. Hei. 1-340394 mentioned in (3) above in which the size of the coating head is determined so as to make the quantity of the coating composition extruded from a slit top end portion uniform in the widthwise direction, deviations in thickness of the coating film are apt to occur depending on the shape of the support or the coating head. Accordingly, similar to the case of (1), there has been a problem that it is difficult to perform coating stably and continuously.

That is, in a coating method using an extrusion-type coating head it is indeed possible in the conventional technique (3) to obtain a product having no deviation in the thickness of the coated film if there is no widthwise unevenness (rigidity, thickness, tension, etc.) of the support 1. In an actual case, however, it is impossible as a practical matter to prepare a support having essentially no widthwise unevenness at all, and if it were possible to provide such a support, the support would be too expensive to use. It is therefore necessary to employ a support having some unevenness in the widthwise direction.

SUMMARY OF THE INVENTION

It is therefore an object of the present invention to provide a method for preventing widthwise deviations in thickness of a coating film caused by widthwise unevenness of the support, thereby to produce a magnetic recording medium having a coating which is very uniform in thickness.

As a result of various studies carried out by the present inventors, it has been found that an extrusion-type coating method meeting the desired goal can be realized under certain combinations of the liquid pressure of the coating composition extruded from the coating head and the elasticity of the running nonmagnetic support.

The foregoing object of the present invention is therefore attained by a method for producing a magnetic recording medium using an extrusion-type coating head in which a magnetic coating composition is continuously extruded from a top end portion of an extrusion slit onto the surface of a flexible support running continuously along a back edge surface and a doctor edge surface having a certain curvature thereby to coat the surface of the support with the magnetic coating composition, characterized in that coating is carried out in such a manner that the following condition is satisfied:

$$12\mu \, (m/d^3)Ut > 0.20(T/R)$$

where
- $\mu$: composition viscosity (poise)
- m: slit length (mm)
- d: clearance of the slit (mm)
- U: coating speed (m/sec)
- t: coating thickness ($\mu$m)
- T: tension at a coating portion (kgf/whole width)
- R: radius of curvature of the doctor edge (mm)

DESCRIPTION OF THE PREFERRED EMBODIMENTS

Figure 1:
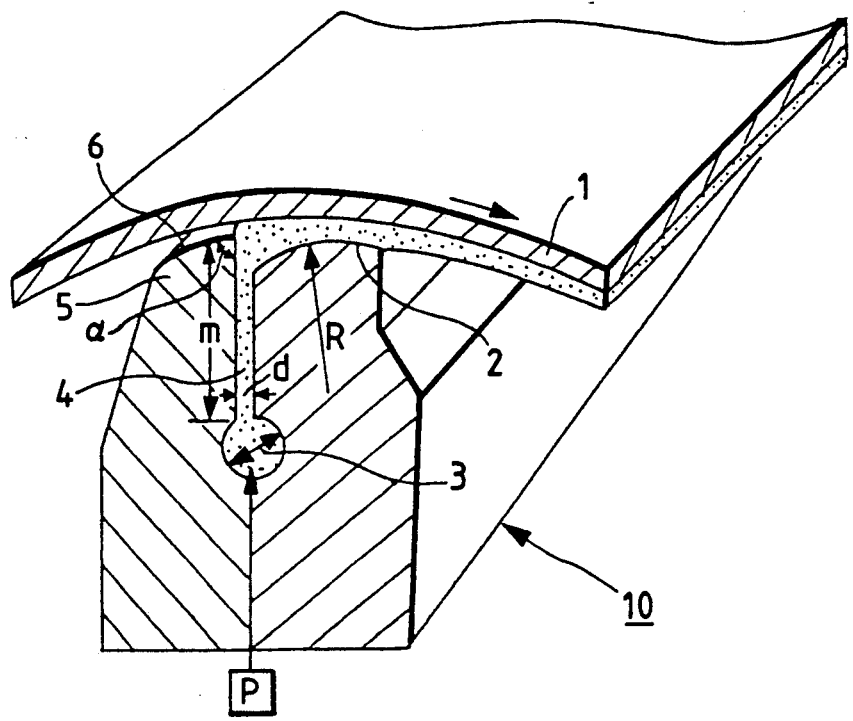
FIG. 1 is a perspective view a coating head and recording medium illustrating a preferred embodiment of a method for producing a magnetic recording medium according to the present invention.

A preferred embodiment of the present invention now will be described in detail with reference to FIG. 1. FIG. 1 is a perspective sectional view of a coating head and recording medium for the case of coating a support 1 with a single layer of a coating composition, namely, a magnetic dispersion liquid, with the use of a coating head 10.

The coating composition is supplied to a pocket of the coating head 10 by means of a pump P, and then extruded through a slit 4 so as to perform coating while maintaining predetermined relationships with respect to a doctor edge surface 2 and on a back edge surface 6.

The coating layer used in the practice of the present invention can be constituted by only a magnetic layer, a magnetic layer having a multi-layer structure, or a combination of magnetic and non-magnetic layers including, at least one magnetic layer.

Figure 2:
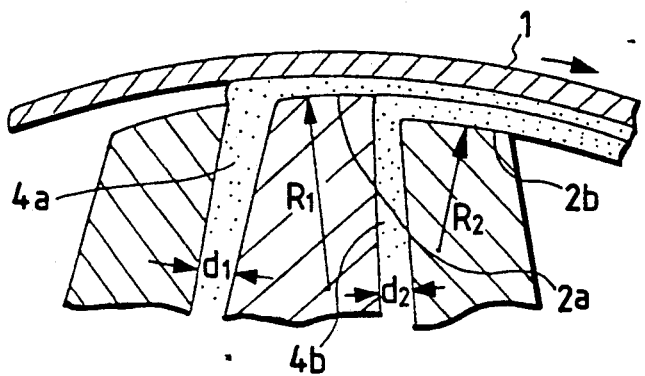
FIG. 2 is a cross-sectional view of a main portion of an extrusion-type coating head used for multi-layer simultaneous coating, to which the present invention is applied.
Figure 3:
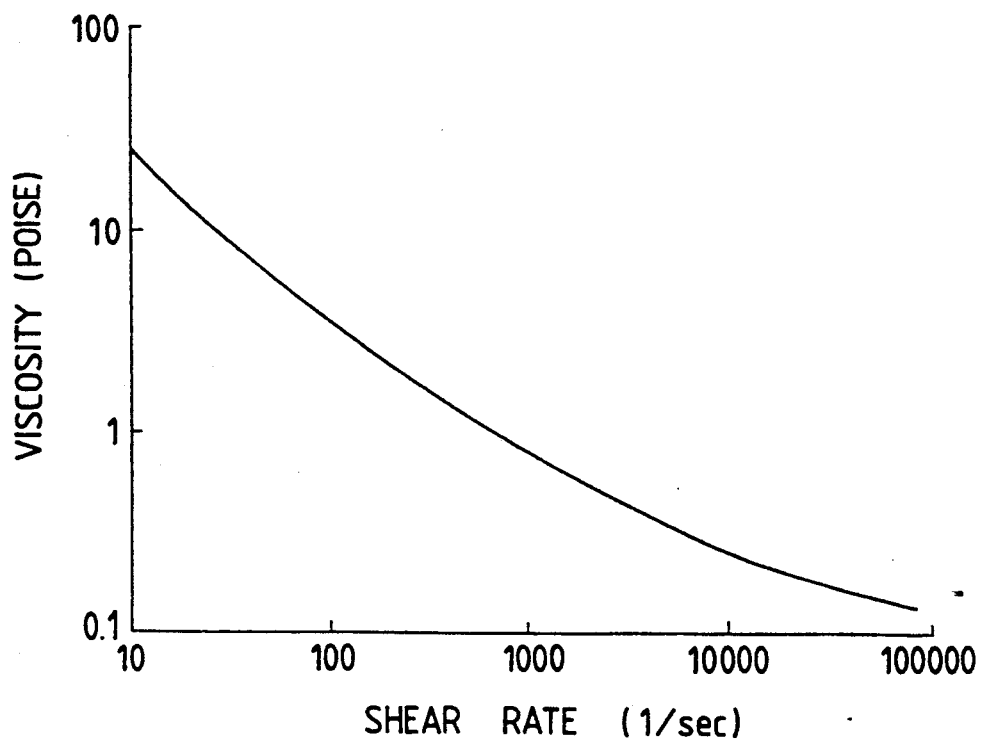
FIG. 3 is a graph of viscosity versus shear rate of a magnetic coating composition used in the practice of the present invention.
Figure 4:
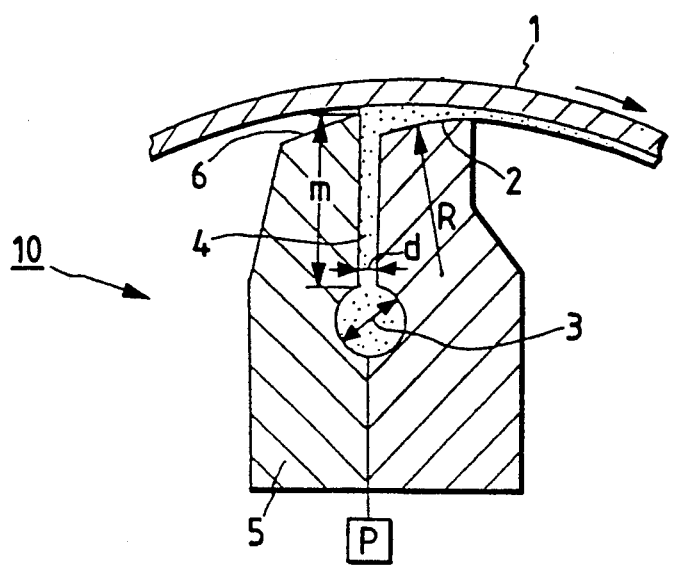
FIG. 4 is a cross-sectional view of an example of an extrusion-type coating head.

The shape of the coating head 10 and the positional relationship between the coating head 10 and a support 1 are shown in FIGS. 1 and 2. A back edge 5 is positioned on the upstream side of the support 1 from the exit of the slit 4, projecting toward the support 1 slightly further than the doctor edge surface 2 disposed on the downstream side in this embodiment.

Further, the back edge 5 is formed so that the entire area of the back edge surface 6 bulges toward the flat surface of the running support 1 adjacent the coating head 10. Although a curved surface is generally preferred for the portion of the back edge 5 bulging toward the support 1, the shape is not so limited, and a combination of flat surfaces may be used. Further, a pre-coating layer may be coated in advance before the magnetic layer is coated.

The doctor edge surface 2 is disposed so that its top end portion is positioned beyond a tangent drawn to the back edge 5 at the exit portion of the slit 4 in the direction away from the support. Further, the doctor edge surface 2 is nearest the support 1 on the downstream side further than the exit portion of the slit 4, so that the coating composition extruded from the slit 4 is smoothed by the doctor edge surface 2. The radius of curvature R of the doctor edge surface 2 is preferably 1 to 10 mm.

The coating head 10 is disposed between two guide rollers (not shown). The lap angle of the support 1 relative to the doctor edge surface 2 in the coating head is about 2° to 60°. Although the overall coating width of the coating head 10 is generally 50 to 3,000 mm, it is not so limited.

A known technique is used for the liquid feeding system, chosen in accordance with the type of the coating composition. Particularly in the case of a magnetic coating composition, which generally has a condensation characteristic, it is preferable to apply shear to the liquid to prevent it from condensing. In this regard, reference can be made to Japanese Patent Application No. Sho. 63-63601 and Japanese Patent Unexamined Publication No. Sho. 62-95174. In the case where no rotor is used, as disclosed in the above Japanese Patent Application No. Sho. 63-63601, it is preferable that the diameter of the pipe arrangement between the pump and the coating head be selected to be not larger than 50 mm, the pocket diameter of the magnetic composition coating head be selected to be in a range of from 2 to 20 mm, the slit width of the magnetic composition coating head be selected to be in a range of from 0.05 to 1 mm, and the slit length be selected to be in a range of from 5 to 150 mm (although these parameters are not limited to these specific values)

In considering the pressure of the coating composition, it is important to consider the pressure $P_w$ produced by the lap of the support 1 against the doctor edge surface 2 of the coating head 10 in FIG. 1 and the liquid pressure $P_s$ inside the slit 4, as it has been found that deviations in the widthwise thickness of the coating film can occur depending on the balance between these two pressures.

That is, in the case where $P_s/P_w < 0.4$, the pressure $P_w$ caused by the lap of the support 1 against the doctor edge surface 2 is larger than the pressure $P_s$ inside the slit 4, as a result of which widthwise unevenness in the thickness of the coating film is apt to occur due to any widthwise unevenness in the thickness of the support.

On the other hand, in the case where $P_s/P_w > 0.4$, the pressure $P_w$ caused by the lap of the support 1 against the doctor edge surface 2 is smaller than the pressure $P_s$ inside the slit 4, so that the influence of widthwise unevenness of the support is small (if any), as a result of which deviations in thickness of the coating film are very small so as to maintain a superior state of coating.

In the case where $P_s/P_w > 1$, the influence of any widthwise unevenness of the support is further smaller (if any), and deviations in thickness of a coating film are more completely suppressed.

The above relationship is applicable not only to a magnetic recording medium having a single-layer magnetic layer structure, but also to a magnetic recording medium having a multi-layer structure composed of two or more layers, as shown in FIG. 2. In the case of a double-layer structure as shown in FIG. 2, the coating performance largely depends on the coating of a lowermost layer ejected from a slit 4 and doctored by a doctor edge surface 2a, and hence the above-mentioned relationship is applicable to this lowermost layer.

The pressure $P_w$ produced by the lap of the support 1 against the doctor edge surface 2 and the liquid pressure $P_s$ inside the slit 4 are specially defined as follows.

Since the liquid pressure $P_s$ inside the slit can be considered to be a Poiseuille's flow inside the slit, it can be obtained by the following expression:

$$P_s = 12\mu \, (m/d^3) Ut$$

where $\mu$: liquid viscosity in the slit (poise)
d: slit clearance (mm)
t: coating thickness (μm)
m: slit length (mm)
U: coating speed (m/sec)

The liquid pressure $P_s$ is determined by the shape of the coating head and properties of the coating liquid.

The pressure $P_w$ produced by the lapping of the support 1 against the doctor edge surface 2 can be measured in a manner disclosed in the above-mentioned Japanese Patent Unexamined Publication No Sho. 62-117666. That is, a pressure gauge is provided immediately before the coating head and a coating liquid is fed by a liquid feeding pump at a predetermined rate. The pressure gauge indicates a value of $(P_o+P_w)$ at the time of coating, where $P_o$ is a value indicated by the pressure gauge when only ejecting the liquid through the coating slit without actually performing coating. The value of $P_w$ can be therefore expressed by the difference of the respective pressures at the time of coating and at the time of non-coating.

In this method, however, the value of $P_w$ is not defined before all the conditions of the coating composition, the extruder, and the coating operation are defined. Therefore, generally, a large number of trials must be carried out to obtain a proper value for $P_w$. Accordingly, this method is not effective. $P_w$ is therefore obtained by a simplified manner as follows.

Although $P_w$ can be obtained by solving a Reynolds equation a Foil's elastic equation through numerical analysis on the doctor edge on the downstream side of the exit of the slit 4, $P_w$ is approximated by the following expression for the sake of simplification:

$$P_w=0.5(T/R)$$

where T represents the tension at the coating portion (kgf/whole width), and R represents the radius of curvature of the doctor edge (mm). That is, $P_w$ can be expressed by the tension in the support and the radius of curvature of the doctor edge. The following expression can therefore be obtained by substituting the values of $P_s$ and $P_w$ from the above expressions into the expression $P_s/P_w > 0.4$.

$$12\mu\ (m/d^3)Ut > 0.20(T/R)$$

Upon carrying out repeated actual coating operations, it was found possible to obtain a superior state of coating in the case where the coating conditions were established so as to satisfy the above expression.

Ferromagnetic fine powder is used for a magnetic layer of a magnetic recording medium according to the present invention. For the ferromagnetic fine powder, known ferromagnetic fine powder such as $\gamma$-$Fe_2O_3$, Co-containing $\gamma$-$Fe_2O_3$, $Fe_3O_4$, Co-containing $Fe_3O_4$, $\gamma$-$FeO_x$, Co-containing $\gamma$-$FeO_x$ (X=1.33 to 1.50), $CrO_2$, a Co—Ni—P alloy, a Co—Ni—Fe—B alloy, an Fe—Ni—Zn alloy, an Ni—Co alloy, a Co—Ni—Fe alloy, etc., may be used. With respect to the grain size of such ferromagnetic fine powder, the length is about 0.005 to 1 micron, and the ratio of axis-length/axis-width is about 1/1 to 50/1. The specific surface area of such ferromagnetic fine powder is about 1 $m^2/g$ to 70 $m^2/g$.

As for the ferromagnetic fine powder, plate hexagonal barium ferrite may be used. Concerning the grain size of barium ferrite, the diameter is about 0.001 to 1 micron, and the thickness is ½ to 1/20 of the diameter. The specific gravity of barium ferrite is 4 to 6 g/cc, and the specific surface area is 1 $m^2/g$ to 70 $m^2/g$.

In practicing the present invention, a binder may be used for the magnetic layer together with ferromagnetic fine powder. As to the binder to be used, conventionally known thermoplastic resin, thermosetting resin, reaction resin, and a mixture thereof can be employed.

As for the thermoplastic resin, a resin having a softening temperature not higher than 150° C., an average molecular weight in a range of from 10,000 to 300,000, and a degree of polymerization in a range of from about 50 to 2,000 may be used. Specifically, the thermoplastic resin may be selected from a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, nylon-silicon system resin, nitrocellulose-polyamide resin, polyvinyl fluoride, a copolymer of vinylidene chloride and acrylonitrile, a copolymer of butadiene and acrylonitrile, polyamide resin, polyvinylbutyral, cellulose derivatives (cellulose acetate butyrate, cellulose diacetate, cellulose triacetate, cellulose propionate, nitro cellulose, etc.), a copolymer of styrene and butadiene, polyester resin, a copolymer of chlorovinyl ether and acrylate, amino resin, thermoplastic resin of various synthetic rubber systems, mixtures thereof, and the like.

As for the thermosetting or reaction resin, a resin having a molecular weight not larger than 200,000 may be used. If a composite used to form the magnetic layer is applied, dried, and thereafter heated, however, such resin may undergo reactions such as condensation or addition, thereby to have an unlimited molecular weight. A preferable resin, therefore, is one which is not softened or dissolved before the resin is decomposed thermally. Specific examples of such resins include phenol resin, epoxy resin, setting polyurethan resin, urea resin, melamine resin, alkyd resin, silicon resin, reaction acrylic system resin, epoxy polyamide resin, nitrocellulose melamine resin, a mixture of high molecular weight polyester resin and an isocyanate prepolymer, a mixture of a methacrylate copolymer and a diisocyanate prepolymer, a mixture of polyester polyol and polyisocyanate, urea formaldehyde resin, a mixture of low molecular weight glycol, high molecular weight glycol and triphenyl methane triisocyanate, polyamide resin, mixtures thereof, and the like.

The ferromagnetic fine powder can be dispersed in a binder together with a solvent, additives such as a dispersing agent, a lubricating agent, an abrasive agent, an antistatic agent, and the like, as conventionally used.

Examples of the dispersing agent include a selacic acid of carbon number 12 to 18 ($R_1COOH$, $R_1$ representing alkyl or alkenyl group of carbon number 11 to 17), such as a caprylic acid, a capric acid, a lauric acid, a myristic acid, a palmitic acid, a stearic acid, an oleic acid, an elaidic acid, a linoleic acid, a linolenic acid, a stearolic acid; a metal soap consisting of alkali metal (Li, Na, K, etc.) or alkaline-earth metal (Mg, Ca, Ba) of the above-mentioned selacic acid; a compound including fluorine of the above-mentioned selacic ester; an amide of the above-mentioned selacic acid; polyalkylene oxide alkyl phosphate; lecithin; trialkyl polyolefin oxy-fourth-ammoniate (carbon number of alkyl is 1 to 5, olefin is etylene, propylene, etc.); and the like. Other than those mentioned above, high grade alcohol of carbon number not less than 12, sulfate, etc., may be used.

As for the lubricating agent, while the above-mentioned dispersing agents have a lubricating effect, examples of suitable lubricating agents include: silicon oil such as dialkyl polysiloxane (carbon number of alkyl is 1 to 5), dialkoxy polysiloxane (carbon number of alkoxy is 1 to 4), monoalkyl monoalkoxy polysiloxane (carbon number of alkyl is 1 to 5, and carbon number of alkoxy is 1 to 4), phenyl polysiloxane, phloroalkyl polysiloxane (carbon number of alkyl is 1 to 5), etc., fine powder such as graphite, etc.; inorganic fine powder such as molybdenum disulfide, tungsten dioxide, etc.; plastic fine powder such as polyethylene, polypropylene, copolymer of polyethylene-vinyl chloride, polytetrafluoro-ethylene, etc.; an α-olefin polymer; unsaturated aliphatic hydrocarbon in liquid phase at ordinary temperature (α-olefin in which double bond is connected to an end carbon, carbon number of about 20); selacic esters consisting of a mono- basic selacic acid of carbon number 12 to 20 and monovalent alcohol of carbon number 3 to 12, fluorocarbons, etc.

Examples of the abrasive agent include fused alumina, silicon carbide, chromic oxide ($Cr_2O_3$), corundum, artificial corundum, diamond, artificial diamond, garnet, emery (main components: corundum and magnetite), etc.

Examples of the antistatic agent include conductive fine powder such as carbon black, a carbon black graft polymer, etc.; a natural surface-active agent such as saponin; a nonionic surface-active agent such as alkylene oxide systems, glycerin systems, glycidol systems, etc.; a cation surface-active agent such as high grade alkyl amines, fourth-class ammoniates, complex cyclos such as pyridine, and others, phosphoniums or sulfoniums, etc.; an anioic surface-active agent containing a base such as a carboxyl group, a sulfo group, a phosphoric group, a sulfuric ester group, a phosphoric ester group, etc.; and a double-characteristic surface-active agent such as amino acids, amino-sulfo acids, sulfuric or phosphoric esters of amino alcohol, etc.

Examples of the organic solvent to be used as a coating solvent include ketone systems such as acetone, methyl ethyl ketone, methyl isobutyl ketone, cyclohexanone, etc.; ester systems such as methyl acetate, ethyl acetate, butyl acetate, ethyl lactate, glycol acetate monoethyl ether, etc.; tar systems (aromatic hydrocarbons) such as benzene, toluene, xylene, etc.; hydrocarbon chlorides such as methylene chloride, ethylene chloride, carbon tetrachloride, chloroform, ethylene chlorohydrin, dichlorobenzene, etc.; and the like.

The quantity of the solvent is two to three times as much as that of the magnetic fine powder. Per 100 parts by weight of the binder, the dispersing agent is 0.5 to 20 parts by weight, the lubricating agent is 0.2 to 20 parts by weight, the abrasive agent is 0.5 to 20 parts by weight, the conductive fine powder to be used as the antistatic agent is 0.2 to 20 parts by weight, and the surface-active agent to be used as the antistatic agent in the same manner is 0.1 to 10 parts by weight.

The magnetic powder, the binder, the dispersing agent, the lubricating agent, the abrasive agent, the antistatic agent, the solvent, etc., are mixed to prepare a magnetic paint.

Examples of the materials for the support on which the magnetic layer is coated include polyester such as polyethylene terephthalate, polyethylene naphthalate, etc.; polyolefin such as polypropylene, etc.; cellulose derivatives such as cellulose triacetate, cellulose diacetate, etc.; vinyl system resin such as polyvinyl chloride, etc.; plastic film of polycarbonate, polyamide resin, polysulfone, etc.; metal materials such as aluminum, copper, etc.; ceramics such as glass, etc.; and the like. These supports may be subjected to pre-treatment in advance, such as a corona discharge treatment, plasma treatment, primer coating treatment, heat treatment, metal deposition treatment, alkali treatment, and the like. The supports may have various shapes.

As has been described, in the coating method for forming a magnetic recording medium according to the present invention, conditions are defined concerning the relationship between the pressure of the liquid used for coating and the pressure produced by the lapping of the support to the doctor edge surface so that, even if the support is uneven in the widthwise direction, it is possible to obtain a magnetic recording medium in which widthwise deviations in the thickness of the coating film are largely eliminated and the characteristic of the surface is superior. Further, it is not only possible to easily establish desired coating conditions, but it is also possible to increase the speed of coating beyond that obtainable in the conventional case.

Next, the novel effects of the present invention will be made more clear by way of example.

After the components of the coating composition listed below were placed in a ball mill, mixed and sufficiently dispersed, epoxy resin (epoxy equivalent 500) was added thereto in an amount of 30 parts by weight, mixed and dispersed uniformly to thereby prepare a magnetic coating composition (magnetic dispersion composition). The viscosity of the thus-prepared magnetic coating composition was measured by a roto-viscometer, and thixotropic viscosities thus measured are shown at the respective shear rate.

Components of the coating composition

| | |
|---|---|
| γ-$Fe_2O_3$ powder (needle-like particles of average grain size in the direction of length: 0.5 μm, coercive force: 320 oersted) | 300 parts by weight |
| copolymer of vinyl chloride and vinyl acetate (copolymerization ratio: 87:13, copolymerization degree: 400) | 30 parts by weight |
| conductive carbon | 20 parts by weight |
| polyamide resin (amin-valent: 300) | 15 parts by weight |
| lecithin | 6 parts by weight |
| silicon oil (dimethyl polysiloxane) | 3 parts by weight |
| xylene | 300 parts by weight |
| methyl isobutyl ketone | 300 parts by weight |
| n-butanol | 100 parts by weight |

Coating was carried out under the conditions that a polyethylene terephthalate film having a thickness of 15 μm and a width of 500 mm was used as the support 1 as shown in FIG. 1, while the tension of the support at the coating portion was set to three levels of 7.5, 10.0 and 12.5 kgf/whole width. For the extruder, an extruder of the type shown in FIG. 1 was used, wherein the back edge surface 6 was flat and had a length of 3.0 mm, the angle α formed between the back edge surface 6 and the upstream side wall surface of the slit 4 was 67.5°, and the diameter of the pocket 3 was 15 mm.

Coating was performed with the thickness of the coating film (t) set to 15 μm by using four different extruders in which the slit clearance (d), the slit length (m), the radius of curvature of the doctor edge 2 (R), and the length of the doctor edge surface were as indicated in Table 1 set forth below, while setting the coating speed (U) to values of 200, 400 and 600 m/min.

TABLE 1

| Type of extruder | Slit clearance | Length of slit | Radius of curvature of doctor edge | Length of doctor edge |
|---|---|---|---|---|
| (1) | 0.3 mm | 40 mm | 2.0 mm | 0.6 mm |
| (2) | 0.3 mm | 10 mm | 2.0 mm | 0.6 mm |

TABLE 1-continued

| Type of extruder | Slit clearance | Length of slit | Radius of curvature of doctor edge | Length of doctor edge |
| --- | --- | --- | --- | --- |
| (3) | 0.3 mm | 10 mm | 1.5 mm | 0.5 mm |
| (4) | 0.6 mm | 40 mm | 1.5 mm | 0.5 mm |

$P_s$ and $P_w$ (kgf/cm$^2$) corresponding to the above conditions were as shown in Table 2.

TABLE 2

| | $P_s$(kgf/cm$^2$) | | | $P_w$(kgf/cm$^2$) | | |
| --- | --- | --- | --- | --- | --- | --- |
| Speed (m/min) | 200 | 400 | 600 | | | |
| Tension (kgf/width) | | | | 7.5 | 10.0 | 12.5 |
| Extruder | | | | | | |
| (1) | 1.00 | 1.27 | 1.52 | 0.38 | 0.50 | 0.63 |
| (2) | 0.25 | 0.32 | 0.38 | 0.38 | 0.50 | 0.63 |
| (3) | 0.25 | 0.32 | 0.38 | 0.50 | 0.67 | 0.83 |
| (4) | 0.29 | 0.39 | 0.44 | 0.50 | 0.67 | 0.83 |

After coating, evaluations were carried out on the widthwise deviations in thickness of the coating films. Table 3 shows the result of these evaluations.

TABLE 3

| Speed (m/min) | 200 | | | 400 | | | 600 | | |
| --- | --- | --- | --- | --- | --- | --- | --- | --- | --- |
| Tension (kgf/width) | 7.5 | 10.0 | 12.5 | 7.5 | 10.0 | 12.5 | 7.5 | 10.0 | 12.5 |
| Extruder | | | | | | | | | |
| (1) | ○ | ○ | ○ | ○ | ○ | ○ | ○ | ○ | ○ |
| (2) | ○ | ○ | ○ | ○ | ○ | ○ | ○ | ○ | ○ |
| (3) | ○ | △ | x | ○ | ○ | △ | ○ | ○ | ○ |
| (4) | ○ | ○ | x | ○ | ○ | ○ | ○ | ○ | ○ |

In Table 3, ○ represents the rate of generation of deviations in film thickness in a range of 0 to 5%, △ represents the rate of generation of the same in a range of from 5 to 20%, and x represents the rate of generation of the same not smaller 20%.

The rate of generation of deviations in film thickness in Table 3 means the rate of generation of samples in which the difference between the maximum and minimum values of the thickness in coating film when it was dried was not smaller than 0.2 μm in the widthwise direction.

Comparing the results of deviation in film thickness shown in Table 3, it was understood that the case where a magnetic recording medium having a superior surface could be obtained stably was coincident with the case where the expression $12\mu (m/d^3)Ut > 0.20(T/R)$ was satisfied.

What is claimed is:

1. A method for producing a magnetic recording medium using an extrusion-type coating head in which a magnetic coating composition is continuously extruded from a top end portion of a slit onto the surface of a flexible support running continuously along a back edge surface and a curved doctor edge surface thereby to coat the surface of the support with the magnetic coating composition, characterized in that coating is effected in such a manner that the following condition is satisfied:

$$12\mu\ (m/d^3)Ut > 0.20(T/R)$$

where
μ: composition viscosity (poise)
m: slit length (mm)
d: clearance of the slit (mm)
U: coating speed (m/sec)
t: coating thickness (μm)
T: tension at a coating portion (kgf/whole width)
R: radius of curvature of the doctor edge (mm).

2. The method of claim 1, wherein said back edge surface is positioned on an upstream side of said support from an exit of said slit and projects toward said support slightly further than said doctor edge surface, said doctor edge surface being disposed on a downstream side of said support.

3. The method of claim 1, wherein said back edge surface bulges toward said support.

4. The method of claim 3, wherein said back edge surface is curved.

5. The method of claim 3, wherein said doctor edge surface is disposed so that a top end portion thereof is positioned beyond a tangent drawn to said back edge surface at an exit portion of said slit in a direction away from said support.

6. The method of claim 5, wherein said doctor edge surface is nearest the support on a downstream side further than said exit portion of said slit.

7. The method of claim 3, wherein a radius of curvature of said doctor edge surface is in a range of 1 to 10 mm.

8. The method of claim 1, wherein a lap angle of said support relative to said doctor edge surface is in a range of 2° to 60°.

9. The method of claim 1, wherein an overall coating width of said coating head is in a range of 50 to 3,000 mm.

10. The method of claim 1, wherein said coating composition is supplied to a pocket in said coating head from a pump through a piping pipe arrangement having a diameter not larger than 50 mm.

11. The method of claim 10, wherein a diameter of said pocket of said coating head is in a range of 2 to 20 mm.

12. The method of claim 11, wherein a width of said slit is in a range of 0.05 to 1 mm.

13. The method of claim 12, wherein a length of said slit is in a range of 5 to 150 mm.

* * * * *